(12) United States Patent
Dubois et al.

(10) Patent No.: US 8,439,500 B2
(45) Date of Patent: May 14, 2013

(54) METHOD OF CALCULATING AN OPTICAL SYSTEM ACCORDING TO A GIVEN SPECTACLE FRAME

(76) Inventors: Frédéric Dubois, Charenton-le-Pont (FR); Cyril Guilloux, Charenton-le-Pont (FR); Pascal Allione, Charenton-le-Pont (FR); Cécile Pietri, Charenton-le-Pont (FR); David Freson, Charenton-le-Pont (FR); Christian Joncour, Charenton le Pont (FR)

( * ) Notice: Subject to any disclaimer, the term of this patent is extended or adjusted under 35 U.S.C. 154(b) by 0 days.

(21) Appl. No.: 12/811,092

(22) PCT Filed: Dec. 23, 2008

(86) PCT No.: PCT/EP2008/068279
§ 371 (c)(1),
(2), (4) Date: Jun. 28, 2010

(87) PCT Pub. No.: WO2009/065968
PCT Pub. Date: May 28, 2009

(65) Prior Publication Data
US 2010/0283967 A1 Nov. 11, 2010

(30) Foreign Application Priority Data
Dec. 28, 2007 (EP) .................................... 07301753

(51) Int. Cl.
*G02C 7/02* (2006.01)
(52) U.S. Cl.
USPC .................................................... 351/159.76

(58) Field of Classification Search ................ 351/41, 351/83–102, 159, 166–177, 159.01, 159.39–159.76; 705/26.5
See application file for complete search history.

(56) References Cited

U.S. PATENT DOCUMENTS

| | | | |
|---|---|---|---|
| 4,524,419 A | 6/1985 | Headlund et al. | |
| 4,630,906 A | 12/1986 | Bammert et al. | |
| 5,485,399 A | 1/1996 | Saigo et al. | |
| 5,790,232 A * | 8/1998 | Hagiwara et al. | 351/177 |
| 5,926,247 A * | 7/1999 | Kimura | 351/41 |
| 6,588,898 B2 * | 7/2003 | Iwai et al. | 351/159 |
| 6,637,880 B1 * | 10/2003 | Yamakaji et al. | 351/177 |
| 6,736,506 B2 * | 5/2004 | Izumitani et al. | 351/204 |
| 6,817,713 B2 * | 11/2004 | Ueno | 351/177 |
| 6,848,789 B1 * | 2/2005 | Yancy | 351/177 |
| 6,871,955 B2 * | 3/2005 | Yamakaji et al. | 351/169 |
| 2002/0176052 A1 | 11/2002 | Ueno | |
| 2007/0008488 A1 | 1/2007 | Esser et al. | |
| 2007/0242220 A1 | 10/2007 | Guilloux et al. | |
| 2008/0273170 A1 * | 11/2008 | Watanabe | 351/177 |
| 2008/0304010 A1 * | 12/2008 | Keane et al. | 351/177 |
| 2009/0125137 A1 * | 5/2009 | Allione et al. | 700/97 |

FOREIGN PATENT DOCUMENTS

EP 0 061 918 10/1982
WO WO 2007/017766 2/2007

* cited by examiner

*Primary Examiner* — Darryl J Collins
(74) *Attorney, Agent, or Firm* — Cozen O'Connor (57) ABSTRACT

A method of calculating an optical system (OS) of an ophthalmic lens according to a given spectacle frame comprising the steps of: providing geometrical data of the spectacle frame, providing wearer data, and optimization of the optical system (OS) according to at least the criteria consisting of the geometrical data of the spectacle frame, the wearer data and at least one positioning data, so as to generate at least two optical surfaces (S1, S2).

25 Claims, 3 Drawing Sheets

METHOD OF CALCULATING AN OPTICAL SYSTEM ACCORDING TO A GIVEN SPECTACLE FRAME

RELATED APPLICATIONS

This is a U.S. national stage of application No. PCT/EP2008/068279, filed on Dec. 23, 2008.

This application claims the priority of European application no. 07301753.5 filed Dec. 28, 2007, the entire content of which is hereby incorporated by reference.

FIELD OF THE INVENTION

The invention relates to a method of calculating an optical system (OS) of an ophthalmic lens according to a given spectacle frame.

BACKGROUND OF THE INVENTION

Usually, a person needing to wear spectacles and having thus a prescription filled by an ophthalmologist goes to the premise of an optician for choosing the frame of the future spectacles. The future wearer of the spectacles may try several spectacle frames and finally chooses one of the tried frames. The optician orders a pair of lenses corresponding to the prescription. The lenses sent to the optician have been designed and manufactured according to optical criteria.

Depending on the service provided by the lens manufacturer, the optician may have to cut the lenses to the fit the spectacle frame the person has chosen or in case of "remote edging" service the optician receives the lenses already cut and only has to fit them in the spectacle frame.

The inner circumference of the openings of the chosen spectacle frame (e.g. the openings of the frame where ophthalmic lenses are intended to be mounted) can be measured very precisely by a measuring device, for example a mechanical sensor. More particularly, the openings of the frame include an inner groove and the characteristics of the groove (tilt angle with the openings, depth of the groove, etc.) can be measured by the mechanical sensor in a measuring room.

The measurements performed by the mechanical sensor on the chosen spectacle frame make it possible to order ophthalmic lenses which fit the chosen spectacle frame, on the one hand, and the wearer prescription, on the other hand.

According to the measurements performed by the mechanical sensor in the measuring room, the optician or the provider of ophthalmic lenses are able to:

determine the best semi-finished lenses for the wearer according to optical criteria, for example the wearer prescription;

edge and bevel the lenses to fit with the measurements performed on the chosen spectacle frame.

In the sense of the invention a step of cutting the lenses according to a spectacle frame shape is called "edging" and a step of forming a bevel on an external edged of the lens is called "beveling."

The lenses provider has to ensure that the provided lenses are adapted to the wearer prescription and to the chosen spectacle frame.

For example, the lenses provider has to ensure that the future lenses can effectively fit the chosen frame which may have particular openings and groove.

It will be thus understood that the measurements performed on the inner circumference openings of the chosen frame and the choice of the semi-finished lens are of great importance for the provider.

Usually, the selection of the semi-finished lens is based on optical criteria, such as the wearer prescription, optical comfort and the measured parameter of the spectacle frame are used for the edging and beveling steps.

In some cases, the edging and beveling step can be proceeded according not only to the measured shape of the spectacle frame but also according to esthetic criteria chosen by the wearer. For example, the esthetic criteria may implies having front face edges of the ophthalmic lens substantially abutting with front faces of the chosen spectacle frame when the ophthalmic lenses are fitted in the frame.

According to the esthetic criteria of the wearer and his prescription it is not always possible to meet both optical and esthetic criteria.

Usually the lens manufacturer will select the semi-finished lens according to the optical criteria and will grind a calculated design fitting the wearer prescription on the rear face of the semi-fined lens.

The person executing the edging and beveling steps, for example the optician, receives the ophthalmic lens and has to proceed to the edging and beveling steps according to the shape of the spectacle frame and to the esthetic criteria of the wearer.

Depending on the shape of the ophthalmic lens, it is not always possible to edge and bevel the ophthalmic lens according to the wearer criteria because of an improper lens shape (external shape of the lens, shapes of the front and rear surfaces of the lens, lens thickness, etc.).

For example, the bevel curve of the spectacle lens may be less steep compared with the curve of the frame, depending on the bevel position, and in this case the frame is deformed so as to be matched with the bevel curve. However, deforming the frame can result in an increase of the frame size beyond the values calculated when the bevel position was selected, and thus in deficiency of the outer diameter or edge thickness of the lens.

Such limitations result from the fact that, the semi-fined lens selection and the design of the lens faces do not take the edging and beveling step into consideration.

SUMMARY OF THE INVENTION

One object of the present invention is to improve the situation.

One aspect of the invention relates to a method of calculating an optical system (OS) of an ophthalmic lens according to a given spectacle frame comprising the steps of:

providing geometrical data of the spectacle frame, providing wearer data, optimization of the optical system (OS) according to at least the criteria consisting of the geometrical data of the spectacle frame, the wearer data and at least one positioning data, so as to generate at least two optical surfaces (S1, S2).

Advantageously, such method allows to takes into consideration the spectacle frame geometry when calculating the optical system of an ophthalmic lens. According to the invention, the optical system of the ophthalmic lens is optimized not only according to optical criteria but also according to the chosen spectacle frame. Therefore, the lenses whose optical system is calculated according to the invention are meant to fit the chosen spectacle frame.

The wearer data can comprise esthetic criteria chosen by the wearer, the ophthalmic lens is than optimized according to both optical and esthetic criteria.

According to further embodiments which can be considered alone or in combination:

during the optimization step edging parameter are generated;

one of the generated optical surfaces is the front surfaces of the spectacle lens;

one of the generated optical surfaces is the rear surface of the lens;

the generated optical surfaces is a diopter surface between the front and rear surface of the spectacle lens;

the optimization criteria further comprises the index of refraction of the optical system (OS);

the optimization criteria further comprises the average distance between Pf and Pl, Pf being the junction point between the front face of the spectacle frame and the internal profile of the spectacle frame and Pl being the junction point between the front face of the ophthalmic lens and the external profile of the ophthalmic lens;

the optimization criteria further comprises the angle between Tf and Tl, Tf being the tangent to the front face of the spectacle frame at the point Pf, Pf being the junction point between the front face of the spectacle frame and the internal profile of the spectacle frame, and Tl being the tangent to the front face of the ophthalmic lens at the point Pl, Pl being the junction point between the front face of the ophthalmic lens and the external profile of the ophthalmic lens;

the optimization criteria further comprises the average tore of one of the faces of the ophthalmic lens and the average tore of one of the face of the spectacle frame;

the geometrical data are obtained by measuring a spectacle frame;

the geometrical data are obtained from a spectacle frame data base;

the geometrical data comprise actual contour parameters and a reference shape;

the geometrical data comprise 3 dimensional data of the spectacle frame;

the geometrical data comprise 2 dimensional data of the spectacle frame and curve data of the spectacle frame;

the geometrical data comprises an internal profile data of the rim of the spectacle frame;

the spectacle lens further comprise geometrical data of the front face of the spectacle frame;

the optimization criteria further comprises the thickness data of the spectacle lens;

the ophthalmic lens is a multifocal ophthalmic lens;

the ophthalmic lens is a progressive ophthalmic lens;

the ophthalmic lens is a monofocal ophthalmic lens;

the optical system (OS) is identified by a optical function (OF), at least two optical surfaces comprise a first optical surface (S1) defined by a first equation (ES1) and a second surface (S2) defined by a second equation (ES2), the optimization step further comprises:
  a generating step (GEN), in which a virtual optical system (VOS) is used to generate a virtual function (VOF);
  a modification step (MOD), in which the virtual function (VOF) is modified so as obtain the function (OF);
  a calculation step (CAL), in which the second equation (ES2) is calculated from the function (OF), and the first equation (ES1).

According to another aspect, the invention relates to an ophthalmic lens manufacturing method comprising the steps of:
  receiving geometrical data of a spectacle frame,
  receiving an optical system (OS) data of an ophthalmic lens, the data being calculated using a method according to the invention,
  manufacturing the calculated ophthalmic lens.

According to further embodiments which can be considered alone or in combination:
  the ophthalmic lens is manufactured using a digital surfacing process;
  the calculation can be proceeded at the manufacturer side and the receiving can be a internal receiving.
  the spectacle frame is selected at a lens order side and the geometrical data are transmitted to a computing device installed at a lens manufacturer side where the calculation steps are processed;
  the spectacle frame is selected at a lens order side and after being manufactured at a lens manufacturer side, the ophthalmic lens is transmitted to the order side with edging parameters;
  the spectacle frame is selected at a lens order side and after being manufactured at a lens manufacturer side, the ophthalmic lens is edged and the edged ophthalmic lens is sent to the order side;
  the manufactured spectacle lens when edged is fitted in the selected spectacle frame.

Another aspect of the invention relates to an ophthalmic lens ordering method comprising the steps of
  selecting a spectacle frame,
  ordering at a lens manufacturer an ophthalmic lens manufactured according to the invention,
  optionally, edging the manufactured ophthalmic lens
  fitting the edged ophthalmic lens in the selected spectacle frame.

According to another aspect, the invention relates to a computer program product comprising one or more stored sequence of instruction that is accessible to a processor and which, when executed by the processor, causes the processor to carry out at least one of the steps of at least one of the method according to the invention.

Another aspect of the invention relates to a computer readable medium carrying one or more sequences of instructions of the computer program according to the invention.

Unless specifically stated otherwise, the cross-section of a rim of a spectacle frame is to be understood as according to a plane comprising the barycentric center of the rim of the spectacle frame.

Unless specifically stated otherwise, the cross-section of an ophthalmic lens is to be understood as according to a plane comprising the barycentric center of the ophthalmic lens.

Unless specifically stated otherwise, the wording "optician" is to be understood as well as eye care professional.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings wherein.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

In the framework of the invention, the following terms have the meanings indicated herein below:

optical axis of the addition lens: direction perpendicular to the front face of the lens and passing through the optical center or PRP for the case of the progressive lens of the latter;

distance-vision region: region of the lens that surrounds the distance-vision point, and within which the local optical characteristics of optical power and of astigmatism of the lens are substantially identical to those at the distance-vision point;

near-vision region: region of the lens that surrounds the near-vision point, and within which the local optical characteristics of optical power and of astigmatism of the lens are substantially identical to those of the near-vision point;

addition of a progressive lens: difference between the value of optical power of the lens at the near-vision point and that at the distance-vision point;

optical characteristics of a lens: data on optical power, astigmatism, aberration, etc., relating to the modifications of a light beam that passes through the lens;

prescription: set of optical characteristics of optical power, of astigmatism and, where relevant, of addition, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription for a progressive lens comprises values of optical power and of astigmatism at the distance-vision point and, where appropriate, an addition value;

surface characteristics of a lens: geometrical data relating to one face of the lens, such as values of average sphere or of cylinder, for example;

average sphere, denoted D: (N−1) times the half-sum of the inverses of the two radii of curvature of a surface expressed in meter, denoted R1 and R2, and determined at the same point on the latter. In other words: $D=(N-1)\times(1/R1+1/R2)/2$, where N is the index of refraction of the lens, and cylinder, denoted C: (N−1) times the absolute value of the half-difference of the inverses of the two radii of curvature of a surface expressed in meter, determined at the same point on the latter. In other words: $C=(N-1)\times|1/R1-1/R2|$;

"height" is used to define a lens or a lens zone dimension corresponding to a vertical when the sight is horizontal;

"width" is used to define a lens or a lens zone dimension corresponding to a horizontal when the sight is horizontal.

Figure 1:
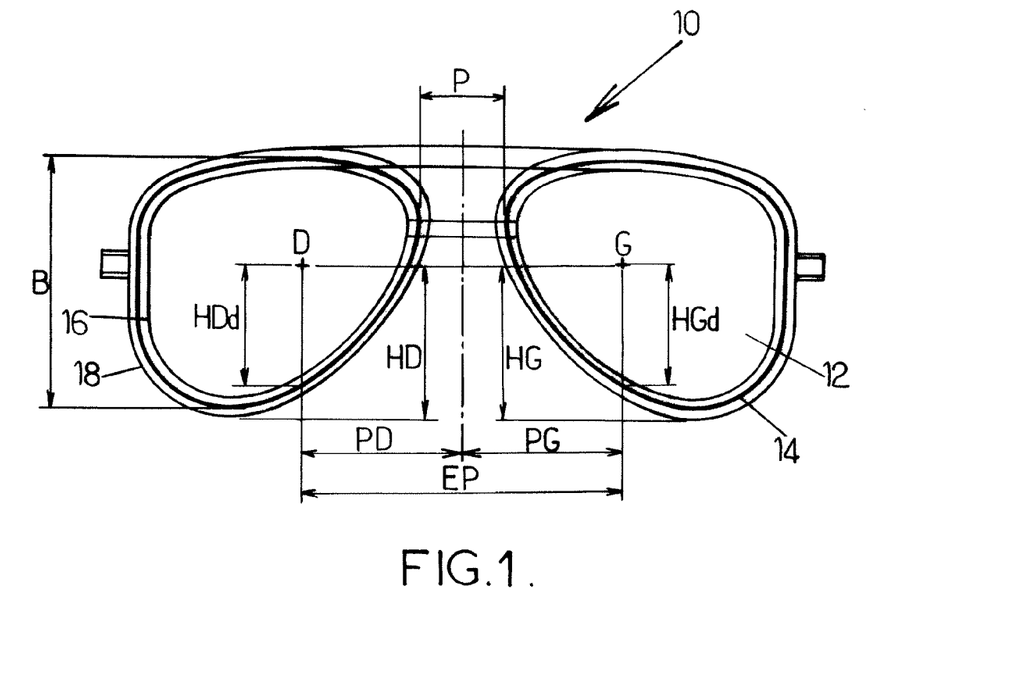
FIG. 1 is the front face of a closed rim spectacle frame.

FIG. 1 shows a representation of a spectacle frame 10 and the position of the right and left pupils of the wearer in the spectacle frame 10, which are respectively referenced D and G.

The figure shows for the frame 10 the contour of the lens in thick lines 14, and in thin lines the internal 16 and external 18 limits of the spectacle frame 10.

An element, made of plastic or another material, the contour of which corresponds to the bottom of the groove of the spectacle frame, is called the template of the spectacle frame. The template is therefore the external shape that the lens must have once cut out in order to fit in the frame spectacle.

The letter B designates the total height of the template determined with the Boxing system, i.e. according to the ISO8624 standard on systems for the measurement of lenses frames. This height corresponds to the height of a rectangle into which the lens fits once it is cut out.

An element connecting the right and left templates of the frame is called the bridge of the spectacle frame, referenced by letter P in FIG. 1.

The right interpupillary half-distance PD and the left interpupillary half-distance PG refer approximately to half of the distance between the two pupils of the wearer. For the fitting of progressive lenses, an optician measures both interpupillary half-distance PD and PG.

The left half-distance, respectively right, is the distance between the vertical axis of symmetry of the frame and the centre of the left pupil, respectively right.

Right boxing height HD, respectively left boxing height HG, refers to the vertical distance between the right pupil, respectively left and the lowest point of the right half-frame, respectively left height.

For the fitting of progressive lenses, the optician may measure the DATUM heights referenced HDd and HGd in FIG. 1. These right and left reference heights are respectively the distances between the right or left pupil and the right or left intersection between a vertical line passing through the pupil and the frame in its lower part.

The measurements of interpupillary distance and of height of the pupil relative to the frame are carried out for a given position of the wearer, namely for the wearer looking at infinity with his head straight.

The features of a given frame can be measured on the frame, using a device known in the art. For example, U.S. Pat. No. 5,333,412 describes a device which makes it possible to measure in 3-dimensions, the shape of the bottom of the groove of the frame. The shape thus determined then makes it possible to calculate the height B.

The features of a frame can also be given directly by the manufacturer according to the model chosen by the wearer.

Using the data thus defined, each lens is cut out such that the fitting cross CM of a progressive lens is situated in the frame facing the pupil of the corresponding eye, when the wearer looks at infinity with his head straight.

Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

Unless specifically stated otherwise, the method according to the invention may apply to any type of spectacle frame, for example metal frames, plastic frames, combination frames, semi-rimless frames, Nylor frames, rimless.

Figure 2A:
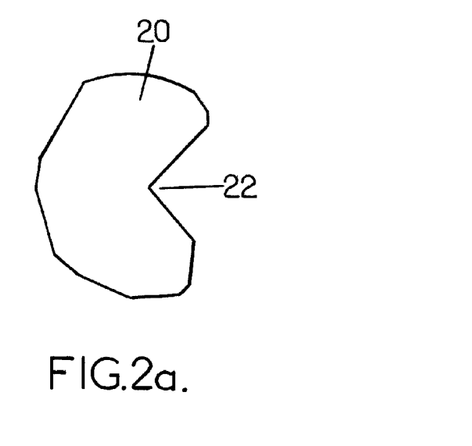
FIGS. 2*a* and 2*b* are cross-sections of two type of spectacle frames rims.
Figure 2B:
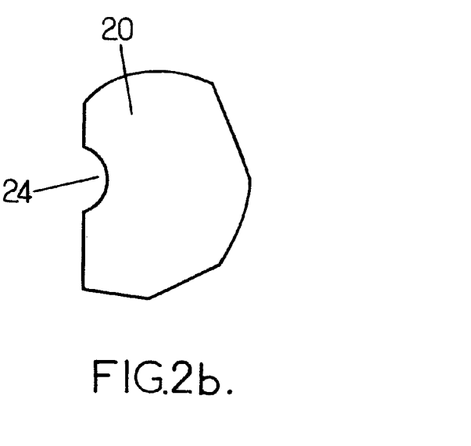

FIGS. 2a and 2b show cross sections of two different rims of spectacle frames.

The rim 20 on FIG. 2a has a V-shaped groove 22, usually corresponding to metal or plastic closed spectacle frame. The lens to be fitted in such closed spectacle frame is beveled so as to have a corresponding Λ-shaped bevel (inverse V shape).

The rim 20 on FIG. 2b has a U-shaped groove 24, usually corresponding to semi-rimless spectacle frame. The lens to be fitted in such semi-rimless spectacle frame is beveled so as to have a corresponding U-shaped bevel and then fitted in the spectacle frame using a retaining cord.

Figure 3:
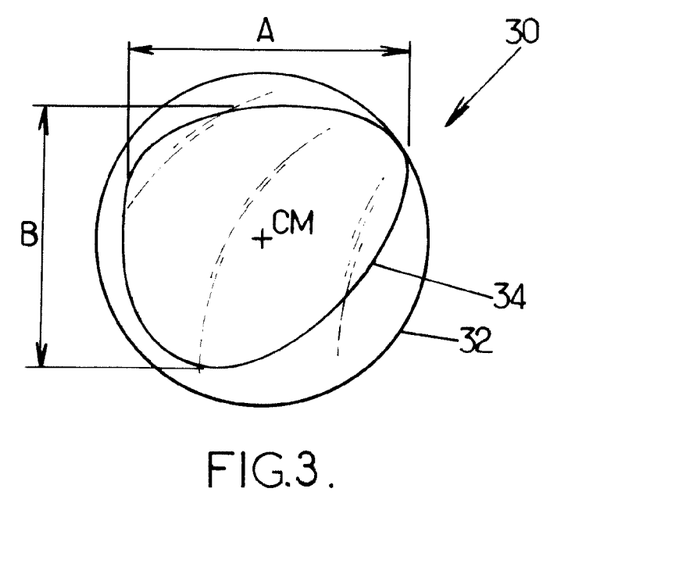
FIG. 3 represents the contour of an ophthalmic lens, before and after edging.

FIG. 3 shows a representation of the contour of an ophthalmic lens, before and after edging. In the figure, the thin line corresponds to the contour of the lens before edging; in a standard manner, the lens has a circular shape. The thick line corresponds to the contour of the template of the frame, which is also the contour of the lens after edging the lens. This edging of the lens followed or combined with a beveling step allows the subsequent fitting of the lens in the spectacle frame.

FIG. 3 shows the total width A of the template of the frame and the total height B of this template, i.e. the width and the height of the rectangle into which the cut-out lens fits. As explained above, the positioning of the lens in the frame consists in determining the desired position of the lens in the frame, using positioning data, for example notable points of the lens.

For example, the fitting cross of the lens, the medium of micro-marks marked on the surface of the lens, or also the optical centre in the case of a single vision lens can be used. In FIG. 3, the fitting cross or optical center is marked by the cross referenced CM.

For a lens which does not have a rotational symmetry, it is also necessary to carry out an angular positioning of the lens in the frame.

Figures 4, 5:
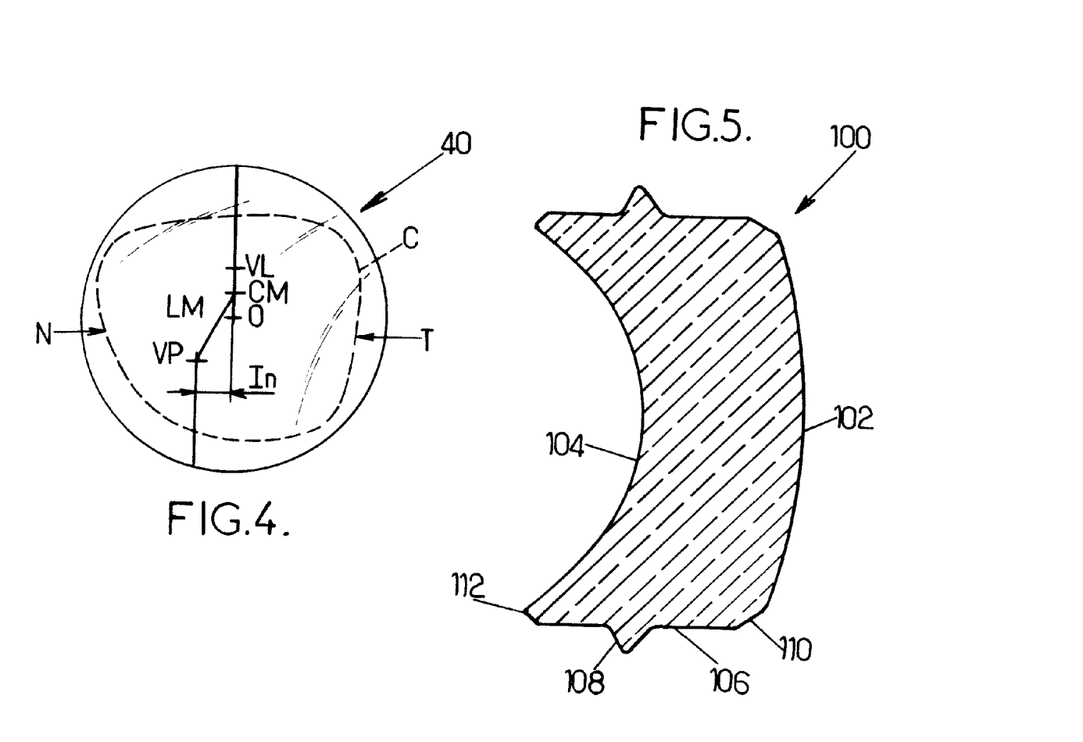
FIG. 4 represents the contour of a progressive additional lens, before and after edging.
FIG. 5 represents a cross section of an ophthalmic lens edged to fit a closed frame rim.

FIG. 4 shows schematically an addition lens, before the latter has been edged around a contour C to the dimensions of a frame. In the figure, the nasal and temporal sides of the lens, respectively denoted N and T, the meridian line LM, the distance-vision and near-vision points, respectively denoted VL and VP, the inset In, and an prism reference point (PRP) of the lens, denoted 0, are indicated.

FIG. 5 shows a cross section of an edged and beveled ophthalmic lens 100. Such ophthalmic lens presents a front face 102, a rear face 104 and a external periphery 106.

The rear face 104 is the face the closest to the eye of the wearer when the ophthalmic lens is fitted on the frame. Usually the rear face 104 is concave and the front face 102 is convex.

The external periphery 106 is preceded during the edging and beveling steps. As represented on FIG. 5 the external periphery presents fitting means, in this case a bevel 108. As discussed previously, the geometry of the bevel, in particular its position and shape, depends on the spectacle frame in which the ophthalmic lens is to be fitted.

Optionally, the external periphery of the lens can present a front face counter bevel 110 and a rear face counter bevel 112.

The present invention relates to a method of calculating an optical system (OS) of an ophthalmic lens according to a given spectacle frame comprising the steps of:
  providing geometrical data of the spectacle frame,
  providing wearer data,
  optimization of the optical system (OS) according to at least the criteria consisting of the geometrical data of the spectacle frame, the wearer data and at least one positioning data, so as to generate at least two optical surfaces (S1, S2).

In the sense of the invention, the final ophthalmic lens may be of any type of known lens, for example uncoloured lens or photochromic lens or solar lens.

In the sense of the invention, the geometrical data include at least contour and shape data.

The contour data may be chosen from, but not limited to, the list comprising:
  3 D perimeter of one of the face of the spectacle frame or of the bottom of the groove,
  the distance in at least one point between the groove bottom and one of the faces of the spectacle frame.

The shape data may be chosen from, but not limited to, the list comprising:
  the tangent at the surface of the front face of the spectacle frame,
  a 3D digital representation of the spectacle frame,
  the average tore, sphere, cylinder of the front face of the spectacle frame,
  the dihedral angle,
  the 3D digital representation of the interior profile of the spectacle frame,
  the tilt angle of the groove of the spectacle frame.

According to the invention, the geometrical data can be obtained by measuring a given spectacle frame using a measuring device well known in the art. Advantageously, the accuracy of the geometrical data is improved. Indeed, although the spectacle frames are produced based on a reference frame, small geometrical differences may exist between a given frame and the reference frame.

The geometrical data can also be obtained from a spectacle frame data base. Advantageously such method is less time consuming.

The geometrical data may also be obtained by a combination of measurements and use of a data base.

According to different embodiment of the invention, the geometrical data may comprise, but is not limited to:
  actual contour parameters and a reference shape,
  3 dimensional data of the spectacle frame,
  2 dimensional data of the spectacle frame and curve data of the spectacle frame, an internal profile data of the rim of the spectacle frame, geometrical data of the front face of the spectacle frame.

According to the invention, the wearer data comprise at least the wearer prescription data, and may also comprise elements chosen from, but not limited to, the list comprising:
- monocular PD,
- fitting point height,
- the pantoscopic angle,
- the choice of an esthetic criteria, for example: "1:1", "1:2", "Front curve tracing".

The "front curve tracing" is a criterion in which the bevel is formed so as to adjoin the front surface of the lens with the front surface of the spectacle frame.

The "1:1" is a criterion in which the bevel is formed on the external edge of the ophthalmic lens so as to have the peak of the bevel at equidistance of the front and rear face of the ophthalmic lens.

The "1:2" is a criterion in which the bevel is formed on the external edge of the ophthalmic lens so as to have the distance between the peak of the bevel and the front face of the lens equal to ½ of the distance between the bevel and the rear face of the lens.

According to the invention, the prescription data may include little or no vision correction. For example, when the ophthalmic lens is a solar lens, the prescription may comprise no vision correction.

In addition to the wearer data the method according to the invention may comprise a step of providing customization data. The customization data may be chosen from, but not limited to, the list comprising:
- the style of life of the wearer,
- the wearer preference,
- the wearer habits.

The optimization step of the method according to the invention may depend on the wearer data and the customization data.

Positioning data are used to optimize the optical system. According to the invention, the "positioning parameters" include at least the 3D or 2D position of a face of the lens according to the contour of a face of the spectacle frame.

The positioning parameters may be chosen from, but not limited to, the list comprising:
- a 3D perimeter of the bevel of the ophthalmic lens,
- the distance between the bevel of the ophthalmic lens and the surfaces of one of the face of the ophthalmic lens,
- fitting rules, for example for a single vision lens placing the optical center at the center of the spectacle frame or in the case of a single vision aspherical lens 4 mm under the position of the pupil.
- engravings that indicate optical point of reference on one of the surface of the optical lens, for example the PRP.

The optimization step will be described in greater details when the optical system is calculated so as to position the front face of the ophthalmic lens according to the front face of the spectacle lens, with the "front curve tracing" esthetic criteria selected.

Different positioning criteria may be used as illustrated in the different embodiments of the invention.

The different embodiments of the invention may generate during the optimization step edging and beveling parameters.

In the sense of the invention edging and beveling parameters include at least the 2D or 3D position and shape of the bevel on the external profile of the ophthalmic lens.

Advantageously, the edging parameter and beveling parameter help the edger or the optician during the edging and beveling steps.

During the optimization step of the method according to the invention one of the generated optical surfaces may be chosen from the list comprising:
- the front surfaces of the lens,
- the rear surface of the lens,
- a diopter surface between the front and rear surface of the lens.

The application WO 2007/017766 teaches a method when having a first surface of an optical system to calculate a second surface of the optical system according to a given prescription.

According to the method disclosed in WO 2007/017766 the optical system (OS), for example of an ophthalmic lens, is identified by a optical function (OF), at least two optical surfaces comprise a first optical surface (S1), for example the front surface of the ophthalmic lens, defined by a first equation (ES1) and a second surface (S2), for example the rear surface of the ophthalmic lens, defined by a second equation (ES2). The method disclosed in WO 2007/017766 further comprises:
- a generating step (GEN), in which a virtual optical system (VOS) is used to generate a virtual function (VOF);
- a modification step (MOD), in which the virtual function (VOF) is modified so as obtain the function (OF);
- a calculation step (CAL), in which the second equation (ES2) is calculated from the function (OF), and the first equation (ES1).

Therefore according to the method of the invention the front face of the ophthalmic lens can be generated based on geometrical data of the spectacle lens and the rear face can be generated based on the wearer prescription and the generated front face using the method disclosed in WO 2007/017766.

In the different embodiments describe hereafter, the front face of the ophthalmic lens and the positioning parameter are generated according to positions criteria of the ophthalmic lens in the spectacle frame. The rear face of the ophthalmic lens and/or a diopter surface between the front an rear face of the ophthalmic lens are generated according not only the geometry of the front surface of the lens but also according to optical criteria, in particular to the wearer prescription.

Figure 6:
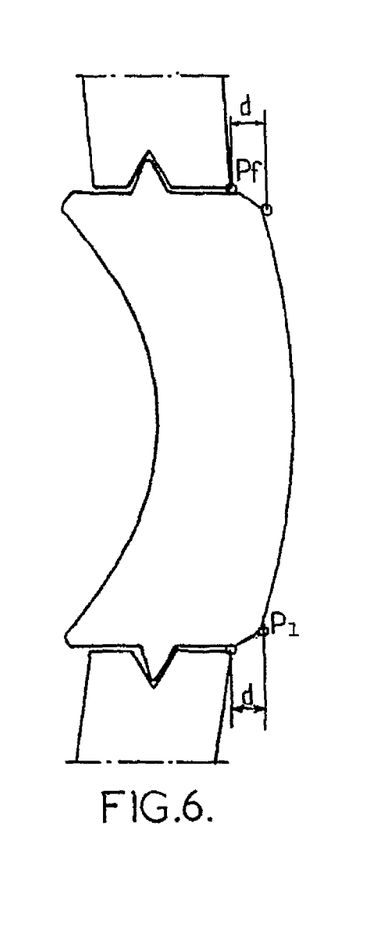
FIGS. 6 to 9 represents cross-sections of an ophthalmic lens fitted in a spectacle frame, the optical system of the ophthalmic lens have been calculated according to different criteria.

According to an embodiment, illustrated on FIG. 6, the ophthalmic lens is calculated so as to position the front face of the ophthalmic lens at a given distance from the front face of the spectacle frame.

The given distance can be chosen by the wearer according to esthetic criteria, if not esthetic criterion is specified it can be considered that the "front curve tracing" criterion is applied.

The "front curve tracing" criteria corresponds to the distance between the front face of the spectacle frame and the front face of the lens as small as possible.

According to an embodiment where the "front curve tracing" criteria has been chosen, the positioning parameter of the ophthalmic lens are calculated so as to have the distance d between the Pf and Pl smaller than 1 mm, preferably smaller than 0.5 mm, preferably smaller than 0.1 mm.

Pf being the junction point between the front face of the spectacle frame and the internal profile of the spectacle frame.

Pl being the junction point between the front face of the ophthalmic lens and the external profile of the ophthalmic lens.

The distance d is calculated in a cross-section, therefore, the criterion should be continually applied for most of the cross sections of the spectacle frame, for example more than 50%, more than 70%, more than 80%, more than 90%, substantially 100%.

In this embodiment the edging and beveling parameter, for example the geometry and position of the bevel on the external contour of the ophthalmic lens, and the rear face of the ophthalmic lens are calculated according to the geometry of the front face of the ophthalmic lens.

Figure 7:
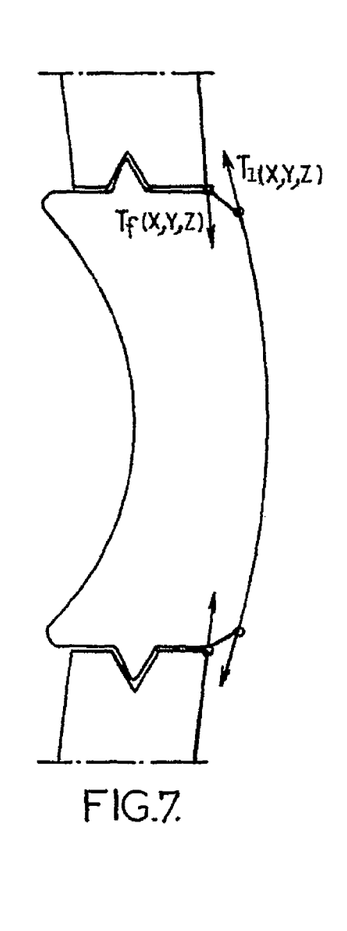

According to an embodiment, illustrated on FIG. 7, the ophthalmic lens is calculated so as to orientate part of the front face of the ophthalmic lens at a given angle from the front face of the spectacle frame.

The given angle can be chosen by the wearer according to esthetic criteria.

According to this embodiment the front face and the positioning parameter of the ophthalmic lens are calculated so as to have the angle between Tf and Tl smaller than 15°, preferably smaller than 10°, preferably smaller than 5.

Tf being the tangent to the front face of the spectacle frame at the point Pf. Pf being the junction point between the front face of the spectacle frame and the internal profile of the spectacle frame.

Tl being the tangent to the front face of the ophthalmic lens at the point Pl. Pl being the junction point between the front face of the ophthalmic lens and the external profile of the ophthalmic lens.

The angle is calculated in a cross-section, therefore, the criteria should be continually applied for most of the cross sections of the spectacle frame, for example more than 50%, more than 70%, more than 80%, more than 90%, substantially 100%.

Figure 8:
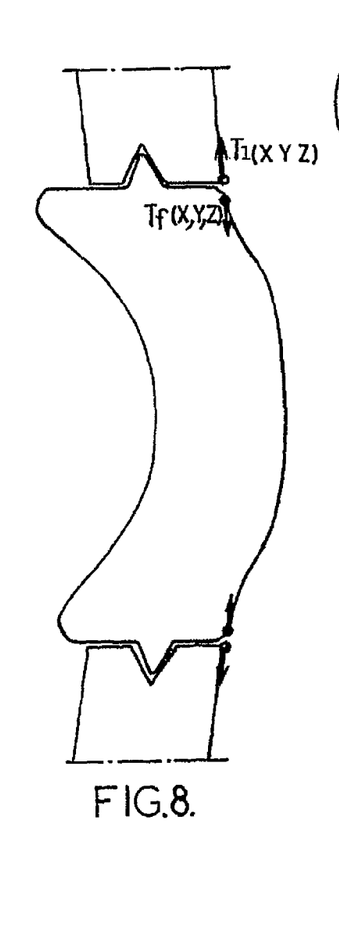

FIG. 8 illustrates a situation where the distance d between Pf and Pl and the angle between Tf and Tl are close to zero. When such a configuration is continually applied to most of the cross-sections can be considered as having the front face of the ophthalmic lens as abutting the front face of the spectacle lens.

Figure 9:
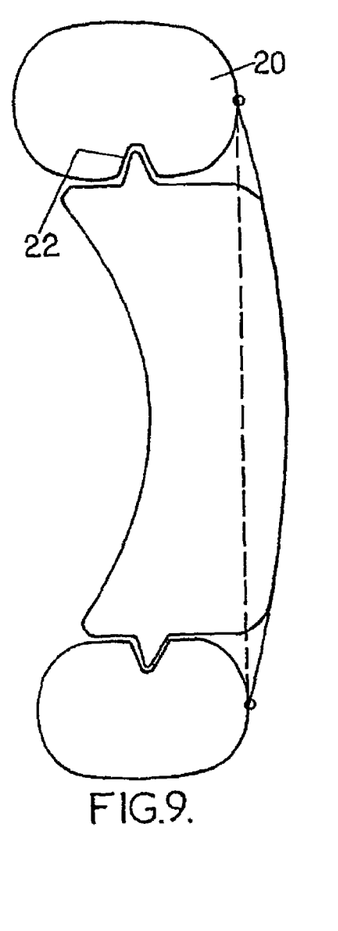

According to an embodiment, illustrated on FIG. 9, the ophthalmic lens is calculated so as to have the average tore of the front face of the ophthalmic lens, expressed in refraction index of 1.53, differ of less than 0.5 Diopter, preferably of less than 0.25 Diopter, most preferably less 0.12 Diopter of the average tore of the front face of the spectacle frame, expressed in refraction index of 1.53.

In some embodiments the average tore can be close to a sphere.

FIG. 9 illustrates a situation where the average tore of the front face of the ophthalmic lens is sensibly equal to the average tore of the front face of the spectacle frame. When such a configuration is continually applied to most of the cross-sections can be considered as having the front face of the ophthalmic lens as abutting the front face of the spectacle lens.

According to an other embodiment of the invention, the method of the invention is for manufacturing an ophthalmic lens, using Digital Surfacing technology, wherein the front surface is calculated so as to be abutting the front face of the spectacle lens and whose rear surfaces is calculated by means of the so-called "optical key" method disclosed in WO 2007/017766.

The general notion of the optimization step is to find a surface that best tests a set of esthetic criteria for example: "1:1", "1:2", "Front curve tracing", relating to the sides (altitudes) and its derivatives (slopes) along a specific contour and other possible constraints.

In the context of DS technology, one can search for any surface making it possible to ensure the contour constraints, for example the sides and/or the slopes. For example, one can search the front surface of the ophthalmic lens that best fits by the set of points of the border of the frame, for aesthetic reasons certain zones of the frame may be favored.

According to different embodiment of the invention, one can search for a surface that minimizes a given merit function while assuring the constraints with respect to whole or part of the spectacle frame contour.

In these cases, the supplementary constraints can also be added to the constraints affecting the sides and the slopes. It may be, for example, constraints of mounting and assembly, a curvature at one or several points (VL, PRP, etc.) and/or a prism at one or several points.

For example, the merit function can be to minimize the area (in $mm^2$) of the surface supported by the contour.

According to the invention, the front surfaces can also be constructed using a reference surface design, the function of merit can be:

$$F(S) = \int_\Omega \alpha(x, y)(Sph(S(x, y)) - Sph(S_{ref}(x, y)))^2 + \beta(x, y)(Cyl(S(x, y)) - Cyl(S_{ref}(x, y)))^2 dx dy$$

where $\Omega$ is the inside of the contour, $Sph(S(x,y))$ is the value of the mean sphere of the surface S at the point (x,y), and where $S_{ref}$ is a reference surface.

The choice of plane (0xy) is somewhat arbitrary but we can generally say, by way of example, that the plane (0xy) corresponds to the plane of the frame and that the axis z is the direction perpendicular to the plane, exiting the lens.

One can also take as the surface that surface that is the solution of an equation of partial $2^{nd}$ or $4^{th}$ order derivatives.

For example: $P(S, S^{(1)}, S^{(2)}) = 0$ where $S^{(i)}$ indicates the partial differentials of the i order of the surface S and P can be the Laplacien function.

Or for example: $P(S, S^{(1)}, S^{(2)}, S^{(3)}, S^{(4)}) = 0$

The function P can be found in Analysis Of A Variational Approach To Progressive Lens Design, Jing Wang, Robert Gulliver, Fadil Santosa.

The differential operator P should verify certain properties, in order to ensure the existence and uniqueness of the solution, for example ellipticity.

The resolution of a partial differential equation (PDE) approach emerges from the linearization of a problem of minimization around the expected solution. This is what is done in the article mentioned above.

The initial constraints are translated by what is usually referred to as "boundary conditions".

In the aforementioned article, simple boundary conditions are considered, for example clamped boundary conditions, and partially clamped boundary conditions or natural boundary conditions.

According to some abutting criteria one should not to limit the boundary condition to the contour but should also consider a crown on which the lens or for example its front face must find support.

The abutting criteria that can be considered include, but are not limited to:
  the datum of the surface of the side on the frame
  the datum of the variation of the surface along the frame (and perpendicular to the contour).

According to an embodiment of the invention, $S_M$ is the surface of the frame. This surface of the frame and that of $S_V$ of the front surface of the lens can be expressed in a point (0xyz).

The surface equations in the plane (0xy) are of the form:

$$z_M = S_M(x,y)$$

$$z_V = S_V(x,y)$$

The surface of the frame is defined at the exterior of a closed contour Γ of the plane (0xy) that defines the perpendicular projection to this plane of the 3D contour of the frame.

Ensuring the abutting of the 2 surfaces may consists in verifying 2 types of constraints:
- contact constraints, and
- tangency constraints.

The contact constraints make it possible to ensure that the anterior face of the lens is in contact with the surface of the frame, that is:

$$S_V(x,y) = S_M(x,y) \text{ at any point (x,y) of } \Gamma,$$

The bevel could be taken into account in the contact constraints.

The tangency constraints make it possible to ensure that the radial slopes of $S_V$ along Γ, that we could name $$\left. \frac{\partial S_V}{\partial n} \right|_\Gamma$$

and those of $S_M$, that we could name $$\left. \frac{\partial S_M}{\partial n} \right|_\Gamma$$

are not too elongated in a certain direction.

One way of defining the tangency constraints is to impose the condition:

$$\left. \frac{\partial S_V}{\partial n} \right|_\Gamma = \left. \frac{\partial S_M}{\partial n} \right|_\Gamma$$

at any point of Γ

This type of constraint is poorly adapted to the case in which the curvature of the surface $S_M$ is increased with respect to Γ, for example in the case of round frames. In this case a constraint of the following type can be defined:

$$\left. \frac{\partial S_V}{\partial n} \right|_\Gamma = \left. \frac{\partial S_M}{\partial n} \right|_{\Gamma + \Delta\Gamma}$$

at any point of Γ, where Γ+ΔΓ is a contour « parallel» to Γ.

One could also impose the condition that the normal derivative of the surface is equal to the radial mean of that of the surface of the frame.

The invention has been described above with the aid of an embodiment without limitation of the general inventive concept; in particular the optimization criteria are not limited to the examples discussed. In particular the invention the method according to the invention can be used with rimless frames, the surface of the front face of the ophthalmic lens is then chosen by the wearer, based for example on the esthetic criteria or optical criteria.

The invention claimed is:

1. A method of calculating an optical system of an ophthalmic lens according to a given spectacle frame comprising the steps of:
   providing geometrical data of the spectacle frame;
   providing wearer data and optimization of the optical system according to at least the criteria consisting of the geometrical data of the spectacle frame, the wearer data and at least one positioning data, so as to generate at least two optical surfaces, wherein the at least one positioning data comprises at least a three-dimensional or two-dimensional position of a front face of the lens according to the contour of a front face of the spectacle frame.

2. The method according to claim 1, wherein during the optimization step edging parameter are generated.

3. The method according to claim 1, wherein the optimization criteria further comprises the index of refraction of the optical system.

4. The method according to claim 1, wherein the optimization criteria further comprises the average distance between Pf and Pl, Pf being the junction point between the front face of the spectacle frame and the internal profile of the spectacle frame and Pl being the junction point between the front face of the ophthalmic lens and the external profile of the ophthalmic lens.

5. The method according to claim 1, wherein the optimization criteria further comprises the angle between Tf and Tl, Tf being the tangent to the front face of the spectacle frame at the point Pf, Pf being the junction point between the front face of the spectacle frame and the internal profile of the spectacle frame, and Tl being the tangent to the front face of the ophthalmic lens at the point Pl, Pl being the junction point between the front face of the ophthalmic lens and the external profile of the ophthalmic lens.

6. The method according to claim 1, wherein the optimization criteria further comprises the average tore of one of the faces of the ophthalmic lens and the average tore of one of the face of the spectacle frame.

7. The method according to claim 1, wherein the geometrical data are obtained by measuring a spectacle frame.

8. The method according to claim 1, wherein the geometrical data are obtained from a spectacle frame database.

9. The method according to claim 1, wherein the geometrical data comprise actual contour parameters and a reference shape.

10. The method according to claim 1, wherein the geometrical data comprises an internal profile data of the rim of the spectacle frame.

11. The method according to claim 1, wherein geometrical data of the spectacle lens further comprise geometrical data of the front face of the spectacle frame.

12. The method according to claim 1, wherein the ophthalmic lens is a multifocal ophthalmic lens.

13. The method according to claim 1, wherein the ophthalmic lens is a monofocal ophthalmic lens.

14. The method according to claim 1, wherein the optical system is identified by an optical function, at least two optical surfaces comprise a first optical surface defined by a first equation and a second surface defined by a second equation, the optimization step further comprises:
   a generating step, in which a virtual optical system is used to generate a virtual function;
   a modification step, in which the virtual function is modified so as obtain the optical function; and
   a calculation step, in which the second equation is calculated from the optical function, and the first equation.

15. An ophthalmic lens manufacturing method comprising the steps of: receiving geometrical data of a spectacle frame, receiving an optical system (OS) data of a spectacle frame, the data are calculated using a method according to claim 1, and manufacturing the calculated ophthalmic lens.

16. The method according to claim 15, wherein the ophthalmic lens is manufactured using a digital surfacing process.

17. The method according to claim 15, wherein the spectacle frame is selected at a lens order side and the geometrical data are transmitted to a computing device installed at a lens manufacturer side where the calculation steps are processed.

18. The method according to claim 15, wherein during the optimization step edging parameters are generated, and the spectacle frame is selected at a lens order side and after being manufactured at a lens manufacturer side, the ophthalmic lens is transmitted to the order side with the edging parameters.

19. The method according to claim 15, wherein the spectacle frame is selected at a lens order side and after being manufactured at a lens manufacturer side, the ophthalmic lens is edged and the edged ophthalmic lens is sent to the order side.

20. The method according to claim 15, wherein the manufactured ophthalmic lens when edged is fitted in the selected spectacle frame.

21. An ophthalmic lens ordering method comprising the steps of: selecting a spectacle frame, ordering at a lens manufacturer an ophthalmic lens manufactured according to claim 15, and fitting the edged ophthalmic lens in the selected spectacle frame.

22. A computer program product comprising one or more stored sequence of instruction that is accessible to a processor and which, when executed by the processor, causes the processor to carry out at least one of the steps of claim 1.

23. A computer readable medium carrying one or more sequences of instructions of the computer program product of claim 22.

24. A computer program product comprising one or more stored sequence of instruction that is accessible to a processor and which, when executed by the processor, causes the processor to carry out at least one of the steps of claim 15.

25. A computer readable medium carrying one or more sequences of instructions of the computer program product of claim 24.

* * * * *